Patented Oct. 31, 1939

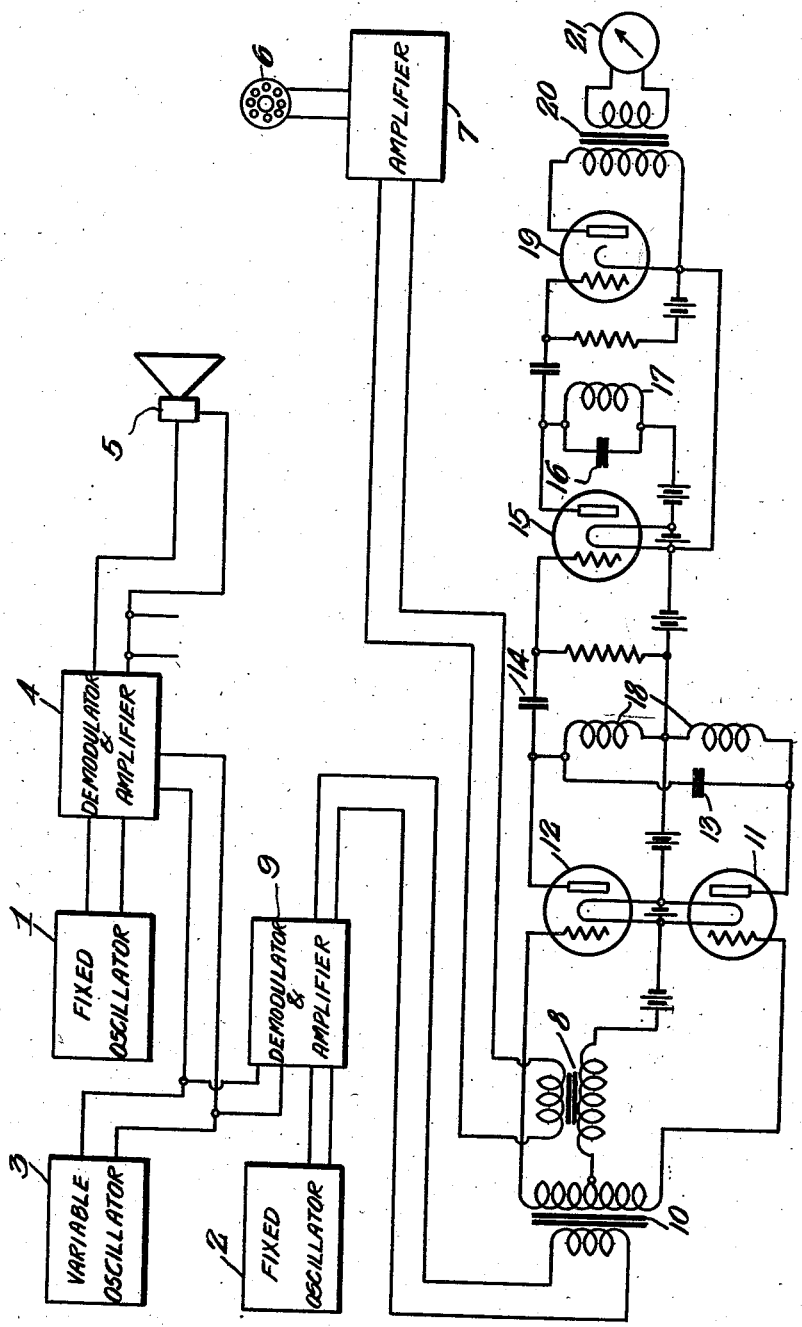

2,178,347

UNITED STATES PATENT OFFICE 2,178,347

METHOD OF AND APPARATUS FOR TESTING ACOUSTIC TRANSLATING DEVICES

Raymond G. Piety, Bartlesville, Okla., assignor to Radio Corporation of America, a corporation of Delaware Application September 11, 1937, Serial No. 163,434

8 Claims. (Cl. 179—175)

This invention relates to a method of and apparatus for testing such acoustic translating devices as loudspeakers, microphones, and other analogous devices for transforming acoustic energy into electrical energy, or vice versa.

The invention involves a novel apparatus for and method of operation thereof whereby the output from a loudspeaker or microphone is readily and directly measured in terms of amplitude, independent of frequency, over the entire frequency range. This is accomplished through the use of a pair of fixed oscillators having a predetermined beat frequency and a variable oscillator which is swept over the frequency range of the apparatus, the output from the device being electrically converted into a current of the beat frequency between the two fixed oscillators, which is then measured directly for its amplitude. The speed of sweep over the frequency range is so chosen as to avoid any reverberation effects.

One object of my invention is to provide an improved apparatus for testing acoustic translating devices.

Another object of my invention is to provide an improved method of measuring the amplitude of response of acoustic translating devices.

Another object of my invention is to provide an improved method of measuring the response of acoustic translating devices over a wide range of frequency in terms of a single beat frequency.

Another object of my invention is to provide an improved method of measuring the response of acoustic translating devices which will avoid the effect of reverberation.

Other and incidental objects of my invention will be apparent to those skilled in the art from a reading of the following specification and an inspection of the accompanying drawing in which The single figure of the drawing is a schematic diagram of the preferred form of my invention.

As shown in the drawing, the apparatus involves two fixed oscillators 1 and 2. These oscillators operate at any convenient frequency above audio frequency and have a frequency difference of a predetermined amount. A frequency difference of 40 cycles between these two oscillators is quite satisfactory for the purpose. A variable oscillator 3 is provided which will provide beat notes against the oscillator 1 covering the entire range over which the apparatus is to be tested. A portion of the output from the variable oscillator 3 is passed to the demodulator and amplifier 4, where it is mixed with the output from the fixed oscillator 1, producing audio frequency beat notes, which, in turn, are transmitted to the apparatus 5, indicated as a loudspeaker, which is under test. The sounds produced by the loudspeaker 5 are picked up by the microphone 6, the electrical impulses from which are amplified by the amplifier 7 and are fed to the transformer 8.

Another portion of the output from the variable oscillator 3 is passed to the demodulator and amplifier 9, where it is mixed with the output from the fixed oscillator 2 producing a beat note differing from the beat note applied to the apparatus 5 by the difference between the oscillators 1 and 2, irrespective of the frequency of the variable oscillator 3. The output from this demodulator and amplifier 9 is fed to the transformer 10, which has a balanced secondary feeding the grids of the tubes 11 and 12. This arrangement, involving the balanced transformer 10, the transformer 8 and the tubes 11 and 12, forms a balanced demodulator mixing the outputs from the amplifier 7 and from the demodulator 9 to produce a beat frequency corresponding to the frequency difference between the oscillators 1 and 2, i. e., 40 cycles, and having an amplitude corresponding to the amplitude of the sounds picked up by the microphone 6. The output from the tubes 11 and 12 is fed through the condensers 13 and 14 to the amplifier 15, which is tuned by the condenser 16 and inductance 17 to the beat frequency between the oscillators 1 and 2, which is also the frequency of the output from the tubes 11 and 12. The output circuit of the tubes 11 and 12 is tuned, like that of the tube 15, to this difference frequency. The output from the tube 15 is fed to the second amplifier tube 19, where it is further amplified, and passed through the transformer 20 to the meter 21. The meter 21 reads the amplitude of the output from the tube 19, which corresponds to the amplitude of the beat note impressed on the tubes 11 and 12, and which therefore corresponds to the output of the device 5 under test.

In the operation of the device, I find it highly advantageous, in order to avoid the effects of reverberation in the room in which the apparatus is used, to move the variable oscillator 3 over the desired range at such a velocity that by the time any reflected sound can reach the microphone 6 the device will be operating on a frequency sufficiently different from its previous frequency so that the beat frequency due to the reverberation will be filtered out in the balanced amplifier above described which, as above stated, is tuned to a predetermined frequency, such as 40 cycles.

It will be apparent that the use of this apparatus is not limited to the testing of loudspeakers but that if a calibrated loudspeaker is used at 5, the apparatus may be used for testing microphones. Likewise, by the use of appropriate mechanical connections or acoustic coupling, the apparatus may be used for testing such devices as telephone receivers, telephone transmitters or phonograph pick-ups.

Having now described my invention, I claim:

1. In combination, means for simultaneously producing two sets of oscillations differing by a predetermined frequency, means for transmitting one of said sets of oscillations through the apparatus under test, means for mixing the two sets of oscillations, and means for measuring the amplitude of the oscillation of the difference frequency.

2. Apparatus of the class described including a fixed oscillator, a variable oscillator adapted to produce a beat note with the said fixed oscillator covering the range over which apparatus is to be tested and means for transmitting the said beat note to the apparatus under test, a second fixed oscillator adapted to produce with said variable oscillator a second beat note differing by a predetermined amount from the first beat note, means for mixing the beat note output of the apparatus under test and said second beat note, and means for measuring the amplitude of the beat note thereby produced.

3. The method of testing electrical apparatus comprising simultaneously producing two sets of oscillations differing by a predetermined frequency, transmitting one of said sets of oscillations through the apparatus under test, mixing the two sets of oscillations, and measuring the amplitude of the oscillation of the difference frequency.

4. The method of testing electrical apparatus comprising simultaneously producing two sets of oscillations differing by a predetermined frequency, transmitting one of said sets of oscillations through the apparatus under test, mixing the two sets of oscillations to produce a beat frequency, and measuring the amplitude of the oscillations of the beat frequency.

5. In testing of acoustic apparatus, the method of avoiding reverberation effects, including the steps of producing sound waves for impression of said acoustic apparatus, varying the frequency of said sound waves at a speed greater than the speed of reverberation, and adjusting said apparatus to receive only the frequencies of said waves received directly from the producer of said waves.

6. The method of testing electrical apparatus comprising simultaneously producing two sets of oscillations differing by a predetermined frequency, transmitting one of said sets of oscillations through the apparatus under test, mixing the two sets of oscillations, measuring the amplitude of the oscillations of the difference frequency, and changing the frequency of said oscillations at such a rate that any difference frequency due to reverberation will be different from the frequency difference of said oscillations.

7. In testing of acoustic apparatus, the method of avoiding reverberation effects including the steps of producing sound waves for impression on said acoustic apparatus, varying the frequency of said sound waves at a rate such that a different frequency is being produced at the time a reflection of a previously produced wave impinges on said apparatus, and tuning said apparatus to the frequency of said directly impressed sound waves to filter out the frequency of said reflected waves.

8. A testing system for acoustic apparatus comprising means for generating sound waves having a continuous variable frequency, said generating means varying the frequency of said waves at a rate such that the frequency being impressed directly from said generator is different from the frequency of the reflected waves reaching said acoustic apparatus, and means for tuning said apparatus to the frequency of said directly impressed wave, said tuning means filtering out the frequency of said reflected waves.

RAYMOND G. PIETY.